(12) United States Patent
Porodo (10) Patent No.: US 11,060,386 B2
(45) Date of Patent: Jul. 13, 2021

(54) TUBULAR FOR DOWNHOLE USE

(71) Applicant: Pro-Pipe Service & Sales Ltd., Nisku (CA)

(72) Inventor: Daniel Porodo, Calmar (CA)

(73) Assignee: Pro-Pipe Service & Sales Ltd., Nisku (CA)

( * ) Notice: Subject to any disclaimer, the term of this patent is extended or adjusted under 35 U.S.C. 154(b) by 9 days.

(21) Appl. No.: 16/244,993

(22) Filed: Jan. 10, 2019

(65) Prior Publication Data
US 2020/0141218 A1     May 7, 2020

Related U.S. Application Data

(60) Provisional application No. 62/754,580, filed on Nov. 1, 2018.

(51) Int. Cl.
| | |
|---|---|
| *F16L 9/04* | (2006.01) |
| *F16L 58/10* | (2006.01) |
| *F16L 59/15* | (2006.01) |
| *E21B 43/24* | (2006.01) |
| *E21B 36/00* | (2006.01) |
| *E21B 37/06* | (2006.01) |

(52) U.S. Cl.
CPC ........ *E21B 43/2408* (2013.01); *E21B 36/003* (2013.01); *E21B 36/006* (2013.01); *B32B 2391/00* (2013.01); *E21B 37/06* (2013.01)

(58) Field of Classification Search
CPC ... F16L 9/04; F16L 9/042; F16L 58/04; F16L 58/10; F16L 58/1054; F16L 59/00; F16L 59/14; F16L 59/15
See application file for complete search history.

(56) References Cited

U.S. PATENT DOCUMENTS

| | | |
|---|---|---|
| 3,616,178 A | 10/1971 | Gurin |
| 3,662,446 A | 5/1972 | Walls |
| 3,673,785 A | 7/1972 | Cullen et al. |
| 3,804,346 A | 4/1974 | Norman |

(Continued)

FOREIGN PATENT DOCUMENTS

| | | |
|---|---|---|
| AU | 2001239069 B2 | 11/2004 |
| CA | 2913712 A1 | 5/2016 |

(Continued)

OTHER PUBLICATIONS

"Flexible Aerogel Insulation for Industrial Applications, Opitmal Thermal Performance in Service up to 650 Degrees Celsius," Aspen Aerogels, Inc., 2017, 2 pages.

*Primary Examiner* — Kenneth L Thompson
(74) *Attorney, Agent, or Firm* — Christensen O'Connor Johnson Kindness, PLLC (57) ABSTRACT

A tubular for downhole use, the tubular including a pipe, an insulation layer surrounding the pipe, and a protective layer around the insulation layer and comprising a polymer. The protective layer can also include a compression layer adjacent to the insulation layer. There may be reinforcement material in the protective layer, for example encapsulated by the elastomer. The tubular may have bare portions at the ends for manipulation of the tubulars to form a tubing string. A sleeve may be provided using the same layer structure to insulate the bare portions which form joints of the tubing string. The sleeve can also include a base layer.

18 Claims, 6 Drawing Sheets

(56) References Cited

U.S. PATENT DOCUMENTS

| | | |
|---|---|---|
| 3,849,941 A | 11/1974 | Barnes |
| 3,981,117 A | 9/1976 | Dehlen |
| 4,146,060 A | 3/1979 | Garrett |
| 4,171,560 A | 10/1979 | Garrett |
| 4,182,537 A | 1/1980 | Oster |
| 4,193,956 A | 3/1980 | Kalnins |
| 4,488,577 A * | 12/1984 | Shilad .................. F16L 59/153 138/103 |
| 4,494,607 A | 1/1985 | Ford |
| 4,602,807 A | 7/1986 | Bowers |
| 4,693,507 A | 9/1987 | Dresen |
| 4,780,347 A | 10/1988 | Cohen |
| 4,823,456 A | 4/1989 | Gray |
| 4,905,760 A | 3/1990 | Gray |
| 5,154,867 A | 10/1992 | Edwards |
| 5,511,619 A | 4/1996 | Jackson |
| 5,513,954 A | 5/1996 | Bourgeois |
| 5,614,267 A | 3/1997 | Howlett |
| 5,713,392 A | 2/1998 | O'Rourke |
| 5,839,551 A | 11/1998 | Cesaraccio |
| 6,010,085 A | 1/2000 | Angeletakis |
| 6,368,700 B1 | 4/2002 | Venkataswamy |
| 6,391,438 B1 | 5/2002 | Ramesh |
| 6,737,134 B2 | 5/2004 | Friedrich |
| 7,015,265 B2 | 3/2006 | Resendes |
| 7,328,724 B2 | 2/2008 | Britton |
| 7,503,387 B2 | 3/2009 | Edwards |
| 7,740,077 B2 | 6/2010 | Davis |
| 7,866,391 B2 | 1/2011 | Wardley |
| 8,113,765 B2 | 2/2012 | Sullivan |
| 8,192,798 B2 * | 6/2012 | Vogt ........................ F16L 9/147 427/407.1 |
| 9,145,999 B2 * | 9/2015 | Carusiello, Jr. ............ F16L 9/02 |
| 9,580,971 B2 | 2/2017 | Mcnease |
| 9,662,823 B2 | 5/2017 | Moore |
| 9,714,677 B2 | 7/2017 | Williams |
| 9,816,169 B2 | 11/2017 | Xie |
| 2002/0197132 A1 | 12/2002 | Cruz et al. |
| 2004/0202521 A1 | 10/2004 | Bostik |
| 2007/0065668 A1 | 3/2007 | Idei |
| 2008/0072988 A1 * | 3/2008 | Elgendy ................ F16L 59/143 138/149 |
| 2008/0174110 A1 | 7/2008 | Olson |
| 2008/0196235 A1 | 8/2008 | Gereluk |
| 2009/0136746 A1 | 5/2009 | Murai et al. |
| 2010/0051199 A1 | 3/2010 | Nooren |
| 2010/0154917 A1 * | 6/2010 | Batallas ................ F16L 59/143 138/141 |
| 2012/0186818 A1 | 7/2012 | Wollmann |
| 2014/0116725 A1 | 5/2014 | Wollmann |
| 2014/0158295 A1 | 6/2014 | Badrak |
| 2014/0175789 A1 * | 6/2014 | Arthur .................... F16L 51/00 285/47 |
| 2016/0060968 A1 | 3/2016 | Xie |
| 2016/0109040 A1 * | 4/2016 | Ruby ........................ B32B 1/08 138/144 |
| 2016/0194916 A1 | 7/2016 | D'Silva et al. |
| 2016/0368199 A1 | 12/2016 | Moore |
| 2016/0369572 A1 | 12/2016 | Moore |
| 2017/0283958 A1 | 10/2017 | Fraser et al. |
| 2018/0031164 A1 * | 2/2018 | Hoffmann ............... F16L 53/37 |
| 2018/0080288 A1 | 3/2018 | Nommensen |
| 2018/0259115 A1 * | 9/2018 | Parrella ................ B29D 23/001 |
| 2019/0203361 A1 * | 7/2019 | Tomoe ..................... C09K 8/54 |

FOREIGN PATENT DOCUMENTS

| | | |
|---|---|---|
| CA | 2915601 A1 | 6/2017 |
| WO | 9502353 A1 | 1/1995 |
| WO | 2010134847 A1 | 11/2010 |
| WO | 2011053186 A1 | 5/2011 |
| WO | 2017217867 A1 | 12/2017 |

\* cited by examiner

TUBULAR FOR DOWNHOLE USE

TECHNICAL FIELD

Tubulars for downhole use.

BACKGROUND

1. Paraffin and Wax Control

Most produced oil has a certain number of heavy ends which consist of wax and paraffins. As the well is produced the temperature drops to a point when the wax and/or paraffins precipitate out (depending on the cloud point temperature) which can form on the tubing and plug and or stop the production.

2. Steam Transfer from Surface to the Reservoir

In a SAGD application steam is generated at surface and pumped down hole to the formation to heat the oil sands (high viscosity) and lower the viscosity so that it can be produced and pumped by an artificial lift method via a pump.

In order to deal with these or other issues, it is therefore desired to have insulation for downhole tubulars.

SUMMARY

There is provided a tubular for downhole use, including a pipe, an insulation layer surrounding the pipe, and a protective layer around the insulation layer, the protective layer comprising a polymer. The protective layer may also comprise a compression layer adjacent to the insulation layer. The compression layer may comprise 2-way tape. The elastomer may be applied to the compression layer to bind to the compression layer. There may be a reinforcement material within the protective layer. The reinforcement material may be at least in part in contact with the compression layer. The elastomer may be applied over the reinforcement material to encapsulate the reinforcement material. The reinforcement material may include a wire, rope, cord or strip. The wire, rope, cord or strip may comprise one or more of metallic wire, carbon fibre, kevlar, fibreglass, or thermoform monofilaments. The insulation layer may comprise aerogel or any other suitable insulation, for example, fibre glass, rock wool, cellulose, vermiculite, perlite, polystyrene, Polyisocyanurate, polyethylene, or phenolic resin. The polymer may comprise an elastomer.

There is also provided a sleeve for wrapping around and insulating a joint of a downhole tubing string, the sleeve comprising an insulation layer; and a protective layer comprising a polymer, the protective layer surrounding the insulation layer when the sleeve is wrapped around the joint. The protective layer may also include an interfacing layer adjacent to the insulation layer. The interfacing layer may comprise 2-way tape. The polymer may be applied onto the interfacing layer to bind to the interfacing layer. There may be reinforcement material within the protective layer. The reinforcement material may be at least in part in contact with the interfacing layer. The polymer may be applied over the reinforcement material to encapsulate the reinforcement material. The reinforcement material may include a wire, rope, cord or strip. The wire, rope, cord or strip may comprise one or more of metallic wire, carbon fibre, kevlar, fibreglass, or thermoform monofilament. The insulation layer may comprise aerogel or any other suitable insulation. The polymer may comprise an elastomer. The sleeve may include a base layer adjacent to the tubing string when the sleeve is wrapped around the joint, the polymer being applied onto at least an end of the sleeve to bind to the base layer at the at least an end of the sleeve.

There is also provided a downhole tubing string having a joint insulated by a sleeve as described above. The sleeve may be secured to the tubing string using steel straps. Sealant may be applied to edges of the sleeve. The sealant may be an additional amount of the polymer. The downhole tubing string may comprise tubulars as described above.

There is also provided a method of forming an insulated tubular for downhole use, the method including the steps of providing a pipe, applying insulation around the pipe, winding a compression material around the insulation, and applying a polymer onto the compression material to bind to the compression material. The compression material may comprise 2-way tape. The compression material may comprise a reinforcement material or the method may include winding a reinforcement material over the compression material. The polymer may be applied over the reinforcement material to encapsulate the reinforcement material. The reinforcement material may comprise a wire, rope, cord or strip. The wire, rope, cord or strip may comprise one or more of metallic wire, carbon fibre, kevlar, fibreglass, or thermoform monofilament. The insulation layer may comprise aerogel or any other suitable insulation. The polymer may comprise an elastomer.

There is also provided a method for forming a sleeve for wrapping around and insulating a joint of a downhole tubing string, the method including providing a mold, applying insulation around the mold, winding an interfacing material around the insulation, and applying a polymer onto the interfacing material to bind to the interfacing material to form the sleeve. The method may also include the step of, after the sleeve is formed, cutting the sleeve longitudinally to separate the sleeve from the mold. The interfacing layer may comprise 2-way tape. Reinforcement material may be wound over the interfacing material. The polymer may be applied over the reinforcement material to encapsulate the reinforcement material. The reinforcement material may comprise a wire, rope, cord or strip. The wire, rope, cord or strip may comprise one or more of metallic wire, carbon fibre, kevlar, fibreglass, or thermoform monofilament. The insulation layer may comprise aerogel or any other suitable insulation. The polymer may comprise an elastomer. The method may also include the step of, before applying the insulation around the mold, applying a base layer around the mold. Applying a polymer onto the interfacing material to bind to the interfacing material to form the sleeve may comprises applying the polymer to at least an end of the sleeve to bind to the base layer at the at least the end of the sleeve.

There is also provided a method for insulating a downhole tubing string, the method including connecting tubulars to form a tubing string, wrapping an insulative sleeve around at least a joint of the tubing string, securing the insulative sleeve around the at least a joint of the tubing string, and inserting the tubing string downhole. The method steps may be repeated for successive lengths of the tubing string. The sleeve may be a sleeve as described above. The sleeve may be one of plural insulative sleeves that are wrapped around multiple connected tubulars with no substantial portions of the multiple tubulars being uncovered by the plural insulative sleeves. The tubulars may be tubulars as described above. The sleeve may be secured to the tubing string using steel straps. The method may also include applying sealant to edges of the sleeve. The sealant may be an additional amount of the polymer.

These and other aspects of the device and method are set out in the claims.

BRIEF DESCRIPTION OF THE FIGURES

Embodiments will now be described with reference to the figures, in which like reference characters denote like elements, by way of example, and in which.

DETAILED DESCRIPTION

Immaterial modifications may be made to the embodiments described here without departing from what is covered by the claims. In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

Figure 1:
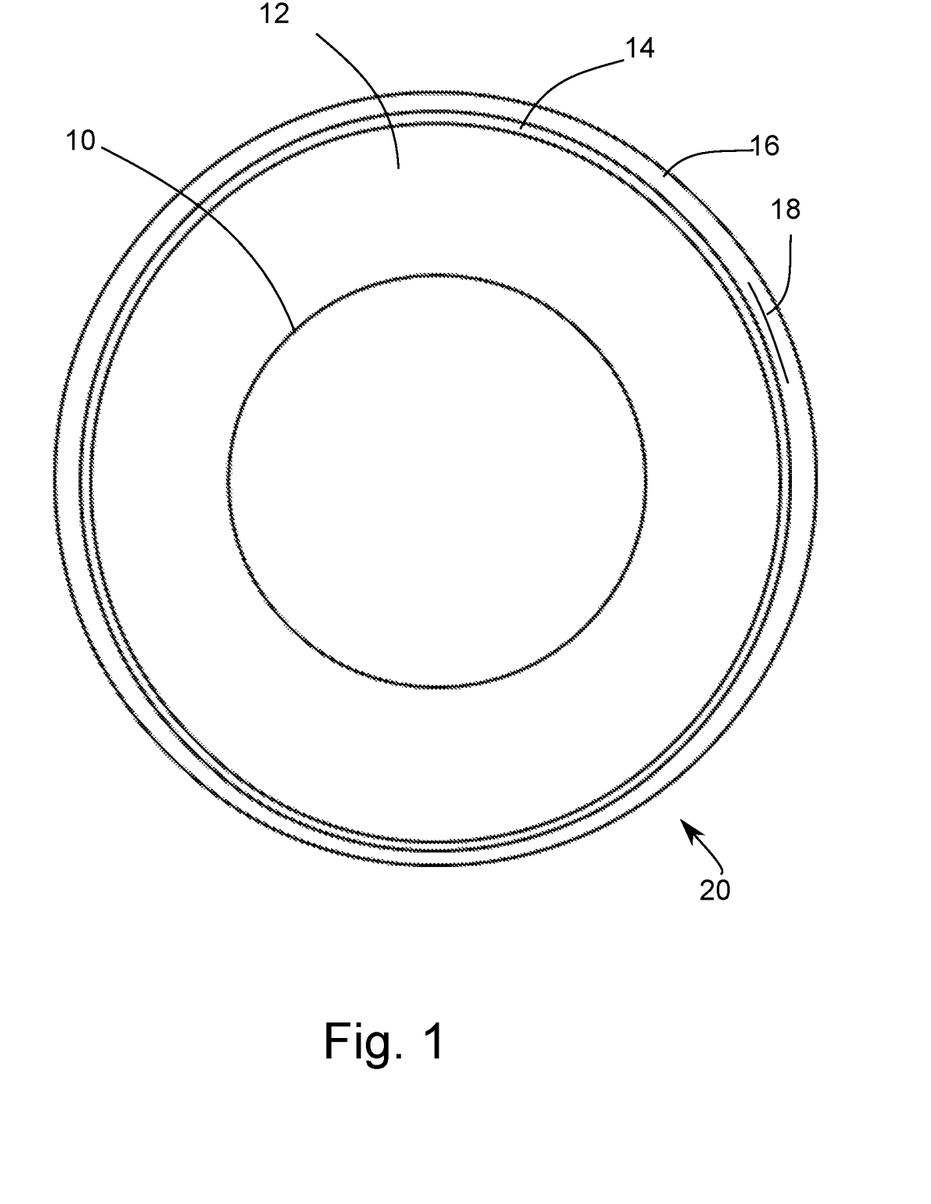
FIG. 1 is a schematic section view through an insulated downhole tubular.

FIG. 1 schematically shows a tubular for downhole use, the tubular comprising, in the innermost part of the tubular, a pipe 10, which may be of conventional construction. An insulative cladding 20 surrounds the pipe, formed for example as follows. In this example, an insulation layer 12 surrounds the pipe 10. An interfacing layer 14 surrounds the insulation layer. The interfacing layer, as may other layers described, may comprise plural layers. The interfacing layer contacts the insulation layer and a protective layer 16. The protective layer 16 may comprise a polymer sprayed onto the interfacing layer. There may be reinforcing material 18 within the protective layer, shown schematically as a single line though typically it would wind around the pipe.

Insulation layer may be any insulation, but is preferably an aerogel. An aerogel is a synthetic porous ultralight material derived from a gel, in which the liquid component for the gel has been replaced with a gas. The result is a solid with extremely low density and low thermal conductivity. Aerogels can be made from a variety of chemical compounds. The aerogel should be selected to withstand downhole temperatures such as temperatures up to 150 C or as much as 280 C.

Figure 5:
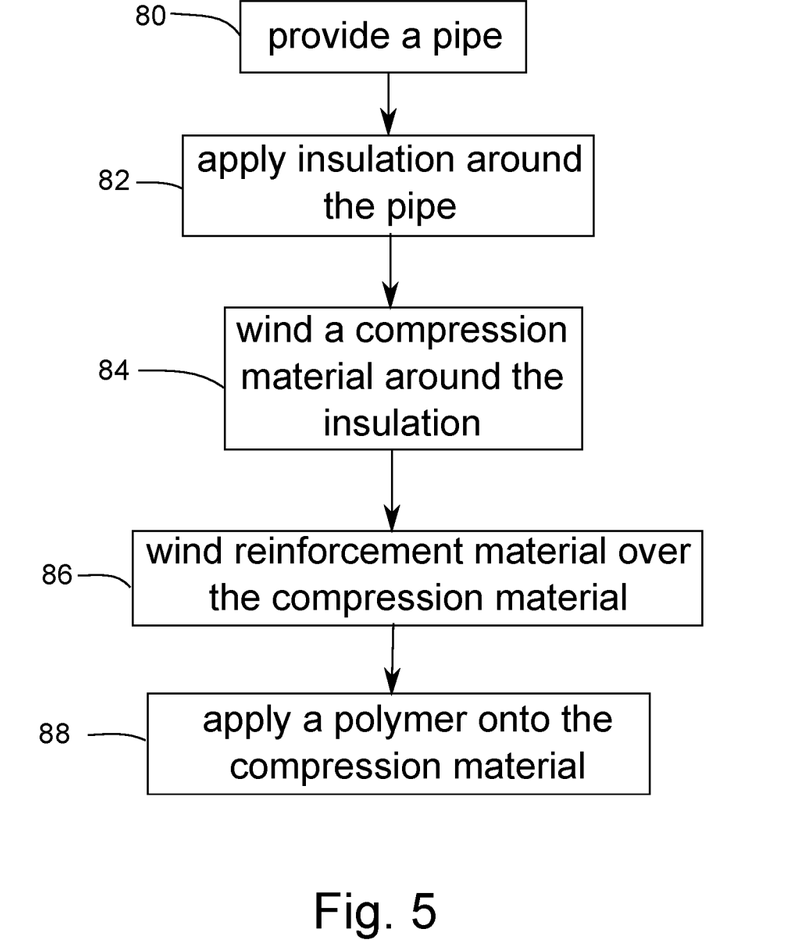
FIG. 5 is a flow diagram showing a method of forming an insulated tubular for downhole use.

FIG. 5 is a flow diagram showing a method of forming an insulated tubular for downhole use. In step 80, a pipe is provided. In step 82, insulation is applied around the pipe. Insulation may be applied to the product in "blanket" form. The insulation may be in the form of pre-cut rectangular sheets. These sheets may then be cut them down to the size needed to surround the pipe. They may then be formed, for example by hand, around the tubular. The sheets may be loosely fastened at several points using adhesive tape or film, depending on tubular diameter.

In a tubular of approximately 9.6 m length there are usually 4 separate pieces of insulation blanket butt jointed and wrapped.

The insulation may also arrive on large rolls which can then be cut down to appropriate width prior to the manufacturing process.

The tape is applied tangentially to the tubular holding the insulation in place for transport to the next step, winding, as well as ensuring the butt joints in the insulation stay together.

An adhesive may be used to secure the insulation layer to the pipe, but this is not preferred as it negatively impacts the compaction process and can result in an unacceptably irregular product.

The initial insulation layer may be applied to the entire tubular except for the ends. For example, approximately 3 ft from the box end (threaded coupling) and 1.5 ft from the pin (threaded end) may be left bare, in order to allowing the elevators (lifting device on the rig) and the tongs (large capacity self-locking wrenches used to assemble downhole tubulars and apply torque) to grip the bare steel. This area that is not coated during the initial process may then be covered with the pre made sleeves, described below, if the thermal demands of the customer require full coverage, after the threaded connection is made on site.

The interfacing layer may be a compression layer, applied to the insulation to compress it against the pipe. In step 84 of FIG. 5, a compression material is wound around the insulation. The interfacing layer may include, for example an adhesive backed (2-way) fabric tape, which may be spiral wound around the insulation layer, partially compacting it as well as isolating it from the other layers. A plastic wrap may be used to provide a more thorough barrier, but this is not preferred as this may result in bubbles in the outer polymer layer. The fabric tape may have micro porosity so that the polymer has something to adhere to. Another layer that was considered was a fabric wrap around the fabric tape, but this is not considered necessary as the outer layer can adequately bond to the fabric tape and no additional separation from the insulation is required.

In optional step 86 of FIG. 5, a reinforcement material is wound over the compression material. Examples of possible reinforcement materials include a wire, rope, cord or strip, for example steel wire or rope, or metal bands, or synthetic wires, ropes or bands, such as made of an aramid fibre such as Kevlar™. A wire, rope, cord or strip wound around the insulation may have a spacing determined by the pipe diameter. For example, on a pipe 2⅜ inches in diameter, the spacing between flights of the wound material may be ½ inch.

The reinforcement material may include a high tensile strength filament and may also be spirally wound around the product further compressing the insulation. This filament may be a metallic wire, or other unidirectional continuous filament. Examples include carbon fibre, kevlar, fibreglass, or thermoform monofilaments.

Presently the reinforcement is wound as a single uniform layer, this makes it easier to avoid pinching due to unbalanced pressures. The pipe may be chucked up in a lathe and an employee may traverse the length with the filament spool resting on a cart, using a braking mechanism to control the tension and spacing. Other approaches include a tunnel wrapper approach or a braiding machine, either of which the insulation covered tubular will pass through as the spool or spools rotate around. The braiding machine may be used to provide the balanced pressure using multiple layers. The fabric tape or other compression material may be wound using the same winding station (e.g. lathe setup, tunnel wrapper or braiding machine).

The filament winding produces a rippled pattern that increases the available surface area for the outer coating to bond to. If the filament chosen for the application is not of a monofilament nature then the high strand count also increases the available surface area for the outer coating to bond to.

In step 88 of FIG. 5, a polymer is applied onto the compression material. This may include applying the polymer onto another layer around the compression material. This polymer may form at least part of a protective layer of the tubular. The polymer may be, for example a phenolic resin, thermoset plastic, thermoplastic, thermoform plastics, epoxies, polyaspartics, and silicones. In an example, the polymer is an elastomer and is a thermoset plastic or thermoplastic. The polymer may be selected to be resistant to temperatures up to 150 C, 200 C or 280 C for example. The outer polymer layer may be for example 50-60 mil thick. If the pipe has an outer diameter of 2⅜ inches, the insulated tubular may have a thickness in the order of 3⅜ inches.

The polymer may be spray applied. In the case that application of the polymer produces gases, to allow for gasses to escape during application of the polymer the spray pattern may be applied from either right to left or left to right. If using an exothermic thermoset polymer, normally this heat is absorbed by the substrate and isn't an issue, though by applying this to a highly insulated substrate the heat causes any trapped air to expand. If the coating is not applied in a linear pattern this expanding hot air cannot escape and bubbles up through the coating. With traditional coatings there is a long enough wet film time to allow the coating to re-level itself, but if the polymer has a rapid setup time, the coating cures while the hot gases escape resulting in tunneling down to the compression layer. By moving in one direction the expanding gases can continue to travel through the insulation matrix to escape as opposed to travelling up through the coating. When the end of the tubular is reached a small amount of coating is applied to verify that the gases are still not rushing out, and once they have stopped the end is sealed with the polymer. This left to right or right to left pattern may be applied at the winding station.

The coating should be applied so as to fully wet out the compression layer as well as the reinforcing material as this then produces a composite matrix that gives the outer coating its strength. This composite that is produced reinforces the properties of the outer layer increasing its abrasion resistance as well as its tensile strength, ensuring the integrity of the insulation envelope during transport and down hole installation. The coating may harden with the reinforcement material already under tension.

Before insulation is applied, the pipe may be blasted to an 8-10 mil profile so that the polymer can adhere to the bare tubing. When the polymer layer is applied, it may also be applied to the ends of the insulated section so that it binds to the bare tubing and seals in the insulation and other layers.

The above description indicates how tubulars can be insulated. To obtain full insulated coverage, additional insulation of the tubing may be completed after makeup is completed on the rig floor. Pre-sprayed sleeves are made up before deployment at a predetermined length to cover the make-up distance. The sleeves can then be attached to the uninsulated connection and secured. The sleeve can then be sprayed with the polymer to result in a fully sealed joint that will not lose heat due to an uninsulated connection.

A sleeve may be produced using the same process as for the regular insulation as described above, albeit on a mold, which may be a pipe or another pipe-shaped mold, and then cut longitudinally (parallel to the mold) and removed as a "C" shaped tubular sleeve. The sleeve can then be used to insulate joints and exposed ends of the tubulars. The Sleeve is produced to a given length dictated by customer demands. Being preformed to the diameter the tubular greatly increases the ease of installation.

Figure 6:
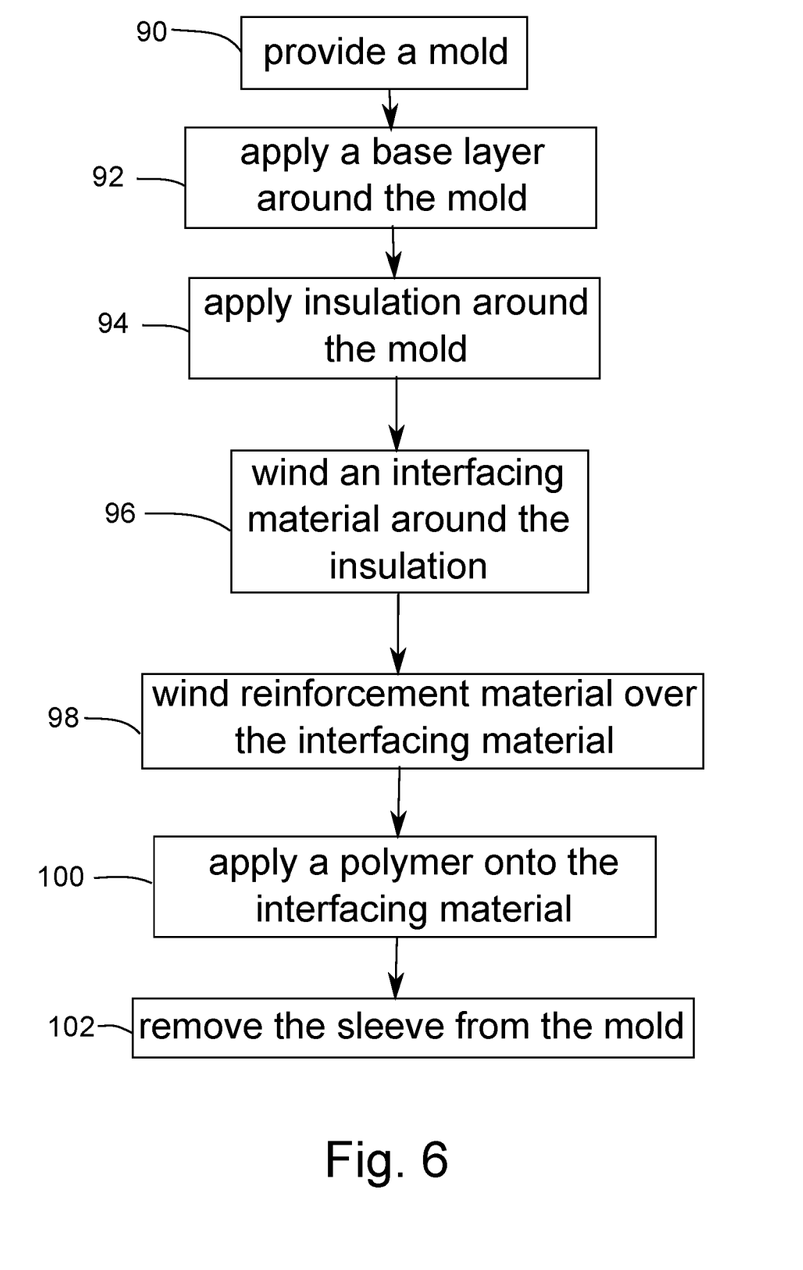
FIG. 6 is a flow diagram showing a method for forming a sleeve for wrapping around and insulating a joint of a downhole tubing string.

FIG. 6 is a flow diagram showing a method for forming a sleeve for wrapping around and insulating a joint of a downhole tubing string. In step 90, a mold is provided.

In optional step 92 of FIG. 6, a base layer is applied around the mold. The base layer is adjacent to the mold, but when the polymer is sprayed onto the outside of the sleeve in step 100, it may also be sprayed onto the ends of the sleeve so that it seals to the base layer. The base layer may extend some distance beyond the edge of the sleeve to give more room to stick to and so that the polymer doesn't stick to the pipe shaped mold. The optional base layer may be selected to be compatible with the polymer as the outer coating has to seal to it on the edges to fully encapsulate the insulation and improve the strength of the sleeve. Once we cut the sleeve to remove it from the pipe shaped mold, without the base layer if care is not taken the insulation can separate from the polymer and reinforcement matrix. While this careful handling is fine in some applications in others a more robust package needs to be created.

Sleeves have been fabricated with and without a base layer on the underside. Because of the hydrophobic nature of the insulation fluid intrusion is usually not much of an issue. The main concern with using a base layer is to ensure cleanliness during transport and installation as well as to ensure no metallic contamination can occur which could result in a corrosion cell underneath the sleeve.

Using a base layer and sealing it to the polymer creates an air and water tight envelope. In some applications fluid does not travel through the space between the production string and the casing tubings, and as a result the insulation is not at risk of fluid entrapment in this area. In other production situations, where the insulated tubular is secured in place with cement, we need to fully isolate the insulation and steel substrates from the cement to inhibit corrosion. There are also further applications where fluid is pumped down this space between the casing and production tubing and again we would want to fully insulate and protect the steel and insulation from this liquid.

The base layer may be formed, for example of a sheet elastomer that is compatible with the polymer top coat. For our current polymer, we use flexible pvc sheeting which provides the required moisture resistance as well as being compatible with the system to provide an air and water tight bond.

In step 94 of FIG. 6, insulation is applied around the mold. If there is a base layer applying the insulation around the mold comprises applying the insulation around the base layer. In steps 96-100, and interfacing material is wound around the insulation, a reinforcement material is optionally wound over the interfacing material, and a polymer is applied onto the interfacing material, including the reinforcement material. In step 102, the sleeve is removed from the mold. This may comprise cutting the sleeve longitudinally.

Figure 3:
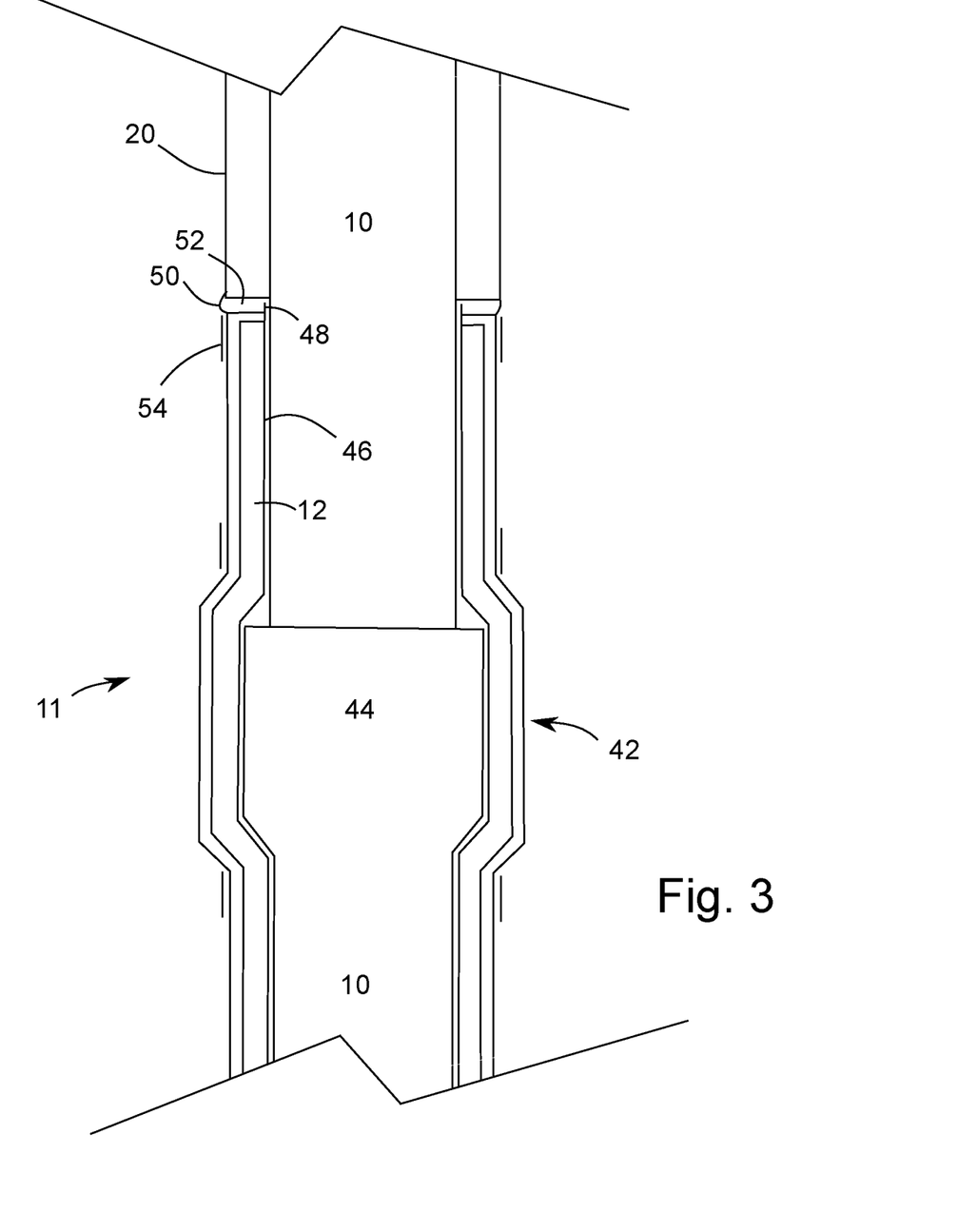
FIG. 3 is a closeup schematic side cutaway view of a joint of a tubing string showing an insulated sleeve about the joint.

FIG. 3 schematically shows, not to scale, a sleeve 42 around a joint 44. In this embodiment, a base layer 46 is shown as a single line bounding insulation layer 12 next to pipe 10. Pipes 10 are connected at joint 44 to form a tubing string 11. The base layer 46 would typically contact pipe 10 but is shown separated from pipe 10 for clarity. The base layer 46 has a portion 48 that extends out from insulation layer 12 and is contacted by protective layer 16. An interfacing layer 14 and reinforcing material 18 as shown in FIG. 1 would typically also be present but are omitted in this figure. A sealant 50 is shown filling a gap 52 between the sleeve 42 and regular insulative cladding 20. Layers of the regular insulative cladding 20 are not shown in this figure but are shown in FIG. 1. The sealant 50 may be formed of the same material forming the protective layer to form a unitary outer coating. Metal bands 54 are also shown around the sleeve 42 to secure it to the pipes 10. While the sleeve 42 is shown covering the joint 44 and adjacent portions of the pipes only, plural sleeves could also be used to cover an entire tubing string.

During installation the tubulars are connected as normal on the rig floor. Prior to insertion down hole but after the connection is made the sleeve is placed around the connection and then secured with stainless steel strapping 54 (e.g. stainless steel zip ties). An alternative method can incorporate collars that can be welded or set screwed to the bare pipe above or below the makeup area to hold the blanket in place. If additional isolation is required the edges and seams can be coated on the rig floor by spraying an additional top coat. The top coat may be the same material that is used for the normal outer coat, which provides a monolithic envelope and ensures the entire tubular string is insulated. A different sealant could also be used.

Figure 4:
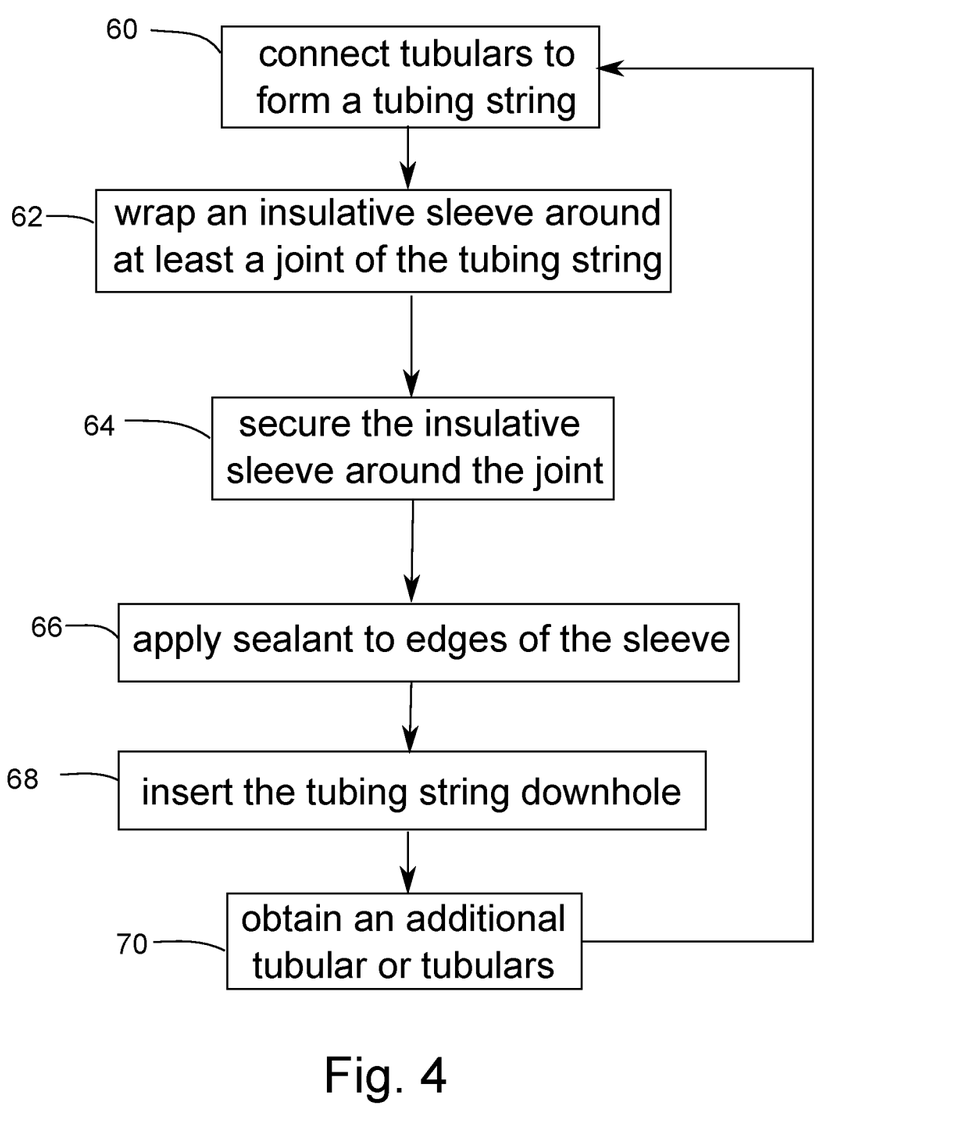
FIG. 4 is a flow diagram showing a method of insulating a downhole tubing string.

FIG. 4 is a flow diagram showing a method of insulating a downhole tubing string. In step 60, tubulars are connected to form a tubing string. The tubulars can be insulated tubulars such as tubulars with an insulative cladding as shown for example in FIG. 1. In step 62 an insulative sleeve, such as for example a sleeve 42 as shown in FIG. 3, is wrapped around at least a joint of the tubing string. In step 64, the insulative sleeve is secured around the at least a joint. This securing may be, for example, with metal bands as shown in FIG. 3. In optional step 66, sealant is applied to edges of the sleeve, which may include a longitudinal edge where the sleeve was cut off a mold, and may include end edges where the sleeve terminates and may contact another sleeve or a regular insulative cladding. The sealant may be an additional amount of the same material used for an outer coating of the sleeve. In step 68, the tubing string is inserted downhole. Inserting the tubing string downhole may include, for example, progressing a tubing string that is already partially downhole further downhole. In step 70, an additional tubular or tubulars are obtained so that steps 60-68 can be repeated for another length of tubing string. The step of connecting tubulars to form a tubing string may comprise connecting a tubular or tubulars to an existing tubing string.

The thickness of the insulation may be determined after a thermal conductivity simulation has calculated the starting and exiting temperature.

Figure 2:
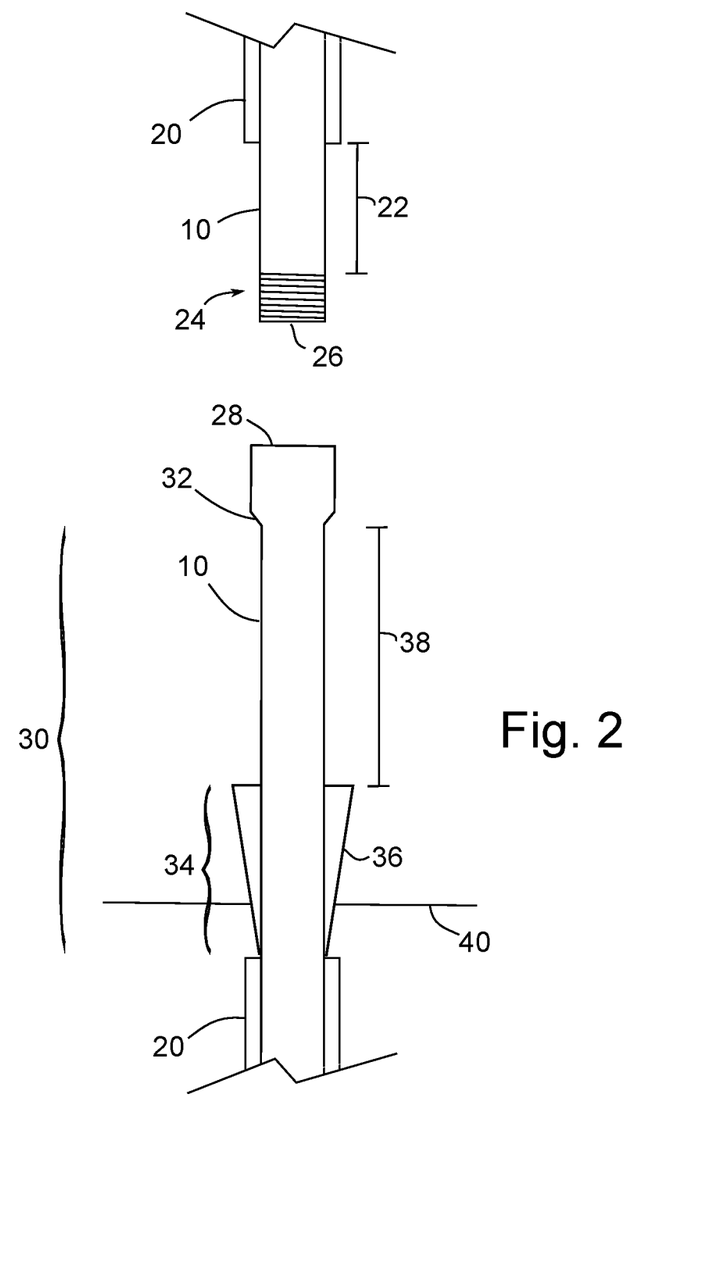
FIG. 2 is a side view of insulated tubulars before being joined for insertion into a well.

The distance that the insulation is from either the pin end and/or the upset end may be selected based on measurements of rig components, such as slips on the rig floor, makeup tongs being used (open faced) and slip type elevators used for pulling and holding the weight of the string after makeup. FIG. 2 shows an example of pipe uninsulated area dimensions in schematic form and is not to scale. In FIG. 2, insulative cladding 20 is separated by thread gap 22 from threads 24 at a pin end 26 of the pipe 10. In an example, the thread gap 22 is 12 inches. At the box end 28, upset gap 30 between upset 32 and insulative cladding 20 comprises space 34 for slips 36 and an additional uncovered gap 38 between the top of slips 36 and upset 32. In an example, the upset gap 30 is 44 inches with 19 inches of space 34 allowed for slips 36 and the additional uncovered gap 38 being 25 inches. If slip-type elevators are used, additional space, for example 14 additional inches, may be required. Rig floor 40 is also shown in this figure with slips 36 between rig floor 40 and pipe 10.

The invention claimed is:

1. A tubular for downhole use, the tubular comprising:
   a pipe;
   an insulation layer surrounding the pipe;
   a compression layer adjacent to the insulation layer;
   a reinforcement material spirally wound around the compression layer; and
   a protective layer around the compression layer, the protective layer comprising a polymer;
   wherein the reinforcement material spirally wound around the compression layer provides a rippled pattern that increases the available surface area for bonding of the protective layer.

2. The tubular of claim 1, wherein the reinforcement material spirally wound around the insulation layer has a spacing between flights.

3. The tubular of claim 1, wherein the reinforcement material spirally wound around the insulation layer compresses the compression layer.

4. The tubular of claim 1, wherein the reinforcement material is a wire, rope, cord, metal band, aramid fibre, or a filament formed of metal, carbon fibre, fiberglass or thermoform monofilament.

5. The tubular of claim 1, wherein the polymer is a phenolic resin polymer, a thermoset plastic polymer, a thermoplastic polymer, a thermoform plastic polymer, an epoxy polymer, a polyaspartic polymer, a silicone polymer, or an elastomeric polymer.

6. A sleeve for wrapping around and insulating a joint of a downhole tubing string, the sleeve comprising:
   an insulation layer;
   a compression layer adjacent to the insulation layer;
   a reinforcement material spirally wound around the compression layer; and
   a protective layer comprising a polymer, the protective layer surrounding the compression layer when the sleeve is wrapped around the joint;
   wherein the reinforcement material spirally wound around the compression layer provides a rippled pattern that increases the available surface area for bonding of the protective layer.

7. The sleeve of claim 6, wherein the reinforcement material spirally wound around the insulation layer has a spacing between flights.

8. The sleeve of claim 6, wherein the reinforcement material spirally wound around the insulation layer compresses the compression layer.

9. The sleeve of claim 6, wherein the reinforcement material is a wire, rope, cord, metal band, aramid fibre, or a filament formed of metal, carbon fibre, fiberglass or thermoform monofilament.

10. The sleeve of claim 6, wherein the polymer is a phenolic resin polymer, a thermoset plastic polymer, a thermoplastic polymer, a thermoform plastic polymer, an epoxy polymer, a polyaspartic polymer, a silicone polymer, or an elastomeric polymer.

11. The sleeve of claim 6, defined by a longitudinal cut to permit stretching of the edges of the sleeve adjacent the cut during installation of the sleeve over the joint.

12. A method of insulating a tubing string, the method comprising:
   connecting a plurality of tubulars according to claim 1 to form a tubing string;
   wrapping an insulative sleeve around one or more joints of the tubing string; and
   securing the insulative sleeve around the joints of the tubing string.

13. The method of claim 12, wherein the reinforcement material spirally wound around the insulation layer has a spacing between flights.

14. The method of claim 12, wherein the reinforcement material spirally wound around the insulation layer compresses the compression layer.

15. The method of claim 12, wherein the reinforcement material is a wire, rope, cord, metal band, aramid fibre, or a filament formed of metal, carbon fibre, fiberglass or thermoform monofilament.

16. The method of claim 12, wherein the polymer is a phenolic resin polymer, a thermoset plastic polymer, a thermoplastic polymer, a thermoform plastic polymer, an epoxy polymer, a polyaspartic polymer, a silicone polymer, or an elastomeric polymer.

17. The method of claim 12, wherein the insulative sleeve comprises:
   an insulation layer;
   a compression layer adjacent to the insulation layer;
   a reinforcement material spirally wound around the compression layer;
   a protective layer comprising a polymer, the protective layer surrounding the compression layer when the sleeve is wrapped around the joint; and
   a longitudinal cut to permit stretching of the edges of the sleeve adjacent the cut during installation of the sleeve over the joint.

18. A sleeve for wrapping around and insulating a joint of a downhole tubing string, the sleeve comprising:
   an insulation layer;
   a compression layer adjacent to the insulation layer;
   a reinforcement material spirally wound around the compression layer; and
   a protective layer comprising a polymer, the protective layer surrounding the compression layer when the sleeve is wrapped around the joint;
   wherein the sleeve is defined by a longitudinal cut to permit stretching of the edges of the sleeve adjacent the cut during installation of the sleeve over the joint.

* * * * *